(12) United States Patent  
Reise et al.

(10) Patent No.: US 6,677,078 B2  
(45) Date of Patent: Jan. 13, 2004

(54) BATTERY CARTRIDGE

(75) Inventors: Terrence Reise, New Milford, CT (US); Bryan L. Hesse, Guilford, CT (US)

(73) Assignee: The Gillette Company, Boston, MA (US)

( * ) Notice: Subject to any disclaimer, the term of this patent is extended or adjusted under 35 U.S.C. 154(b) by 322 days.

(21) Appl. No.: 09/896,881

(22) Filed: Jun. 29, 2001

(65) Prior Publication Data

US 2003/0003349 A1 Jan. 2, 2003

(51) Int. Cl.[7] ............................................... H01M 6/42
(52) U.S. Cl. ...................... 429/159; 429/164; 429/179
(58) Field of Search ............................... 429/164, 179, 429/159

(56) References Cited

U.S. PATENT DOCUMENTS

| | | | |
|---|---|---|---|
| 4,123,598 A | * 10/1978 | Hammel | ...................... 429/159 |
| 4,205,121 A | 5/1980 | Naitoh | |
| 4,389,469 A | 6/1983 | Nicholls | |
| 5,015,546 A | 5/1991 | Dulaney | |
| 5,034,290 A | * 7/1991 | Sands | ........................... 429/120 |
| 5,130,642 A | * 7/1992 | Hoffman | ...................... 324/127 |

* cited by examiner

Primary Examiner—Mark Ruthkosky
(74) Attorney, Agent, or Firm—Barry D. Joseph; Paul I. Douglas; Thomas G. Krivulka

(57) ABSTRACT

A battery cartridge comprising a housing and one or more primary (nonrechargeable) cells therein. The cell can be a single primary cylindrical cell, desirably a primary lithium cell having a voltage of about 3.0 volts. Alternatively, there can be a pair or plurality of such cells electrically connected in parallel within the cartridge housing. The cartridge housing of the invention has an elongated body with an elongated opening in its surface of sufficient size to allow insertion of one or more cylindrical primary cells therein. The housing can be provided with a disk partition which divides the housing interior into two or more chambers, one for each cell. The cartridge can have overall dimensions similar to that of lithium ion or other rechargeable cartridges used to power small size camcorders or digital cameras. Thus, the battery cartridge of the invention has particular utility as a replacement for rechargeable cartridges for such devices. When the cartridge has been discharged, the cells can be removed from the housing and replaced with fresh cells.

12 Claims, 2 Drawing Sheets

BATTERY CARTRIDGE

FIELD OF THE INVENTION

The invention relates to a battery cartridge housing a primary (nonrechargeable) electrochemical cell such as a primary lithium cell, which can be used in place of a rechargeable cartridge.

BACKGROUND

Digital cameras and camcorders and other digital imaging devices are becoming smaller in size. For example, camcorders which are only slightly larger than a person's hand, are now available. Such devices typically are provided with a rechargeable battery cartridge or power pack such as a rechargeable lithium ion cartridge. The rechargeable cartridge has a housing designed to fit and lock in place within a receiving cavity within the imaging device to be powered. The negative and positive terminals on the cartridge housing are oriented to contact negative and positive contacts, respectively, within the device to be powered. The cartridge is normally designed to be removed from the device being powered so that it can be recharged and then reinserted or else it can be recharged while locked in place within the device. In earlier camcorders the rechargeable cartridge was typically of a prismatic or rectangular configuration occupying a significant volume. Such rechargeable packs are commercially available and are fairly large, for example, having a width of about 2 inches or larger and length of about 2 to 3 inches or greater. As the size of camcorders and digital cameras have become smaller, the rechargeable cartridge has also become much smaller, reflecting the need for smaller capacity battery cartridges.

To accommodate the smaller battery cartridge, designers have begun to employ small size rechargeable cylindrical cells, such as small cylindrical lithium ion cells, housed therein. Such small size rechargeable lithium ion cells, for example, could typically have a diameter of between about 15 and 18 mm and larger, for example up to about 32 mm and length between about 25 and 50 mm and greater, for example up to about 58 mm. As the imaging devices become even smaller such rechargeable cells could also become smaller. The lithium ion cell when fully charged has a nominal voltage of about 4.0 volts or somewhat greater and an average voltage during discharge of between about 3.6 volts. Such rechargeable cells are sealed within the cartridge housing and are not intended to be removed therefrom.

It would be a benefit to provide a nonrechargeble primary power source alternative to rechargeable battery cartridges for small size camcorders and digital cameras. The nonrechargeable power source could provide the user with an alternative to the rechargeable cartridge as it can be used as replacement for such rechargeable cartridge. The availability of such nonrechargeable power source could also provide the manufacturer of the small size imaging device the option of providing the nonrechargeable power source included with sale of the device, instead of providing a more expensive rechargeable cartridge therewith.

It is thus desired to provide a primary (nonrechargeable) battery cartridge for small size camcorders, digital cameras and other small size direct current powered electronic devices, wherein the primary cartridge has a voltage preferably about 3.0 volts and can be used interchangeably with a rechargeable cartridge of similar size.

It is desired to provide a primary battery cartridge for small size camcorders, digital cameras and other small size electronic devices, wherein primary cells, preferably primary cylindrical cells, can be inserted easily into the cartridge housing and easily removed therefrom when discharged.

SUMMARY OF THE INVENTION

A principal aspect of the invention is directed to providing a primary (nonrechargeable) battery cartridge that can be used as a primary power source or as a substitution for a rechargeable cartridge for powering small size digital imaging devices such as handheld camcorders or digital cameras. The term "primary cartridge" or "primary cell" or "primary battery" as used hereinafter shall be understood to mean a battery cartridge or electrochemical cell which is not intended to be rechargeable.

The primary (nonrechargeable) battery cartridge of the invention is characterized by having a housing body with an opening therein, preferably an elongated opening, of sufficient size to allow insertion of one or more cylindrical primary (nonrechargeable) cells into the housing interior. The opening is of sufficient size so that when the cell has been discharged, it can easily be removed from the housing and replaced with a fresh cell. The housing is desirably of a nonconductive material such as plastic which can be readily molded by injection or insert molding. The housing is preferably of a single piece integral construction. The housing has an elongated substantially cylindrical shape so that it can accommodate and hug at least a major portion of the surface one cylindrical primary cell placed therein with little, if any, wasted volume. The housing preferably avoids the need for hinged doors and removable covers and the like in order to gain access to the housing interior.

The cartridge housing preferably has a substantially cylindrical body which terminates in a pair of opposing end surfaces with a substantially cylindrical surface integrally formed therebetween. There is preferably an elongated opening taking the form of a cut out portion within the body of housing to allow easy insertion of one or more primary cells therethrough and into the housing interior. Such design avoids the need to have hinged doors and the like attached to the body or end of the housing which must be opened before the cell can be inserted within the housing. However, as an alternative, the housing could be provided with a hinged door, for example, at an end of the housing or as part of the housing body. Opening of such door could allow access to the housing interior and placement of one or more primary cell therein.

There are a pair of electrical contacts within the housing, formed of a strip of conductive metal such as copper or brass. One of said conductive contact strips is intended to contact the negative terminal and the other intended to contact the positive terminal of a cylindrical primary cell placed within the housing. Each of the conductive contact strips terminates in an exposed conductive portion which extends to the outside surface of the housing. One of the exposed conductive portions provides the negative and the other provides the positive terminal on the cartridge housing exterior (cartridge housing positive and negative terminals).

The battery cartridge preferably further comprises a disk within the cartridge housing interior. The disk is located between the opposing housing end surfaces and preferably oriented perpendicular to the housing central longitudinal axis. The disk has an opening therethrough. A metal contact strip can be held in place within the disk opening. Such metal contact strip contacts the positive terminal of a cell within the housing and is in electrical contact with the cartridge housing positive terminal.

When a primary cell is inserted into the cartridge housing, a primary battery cartridge is formed with the exposed negative contact on the housing exterior (cartridge housing negative terminal) in electrical contact with the cell's negative terminal and the exposed positive contact on the housing exterior (cartridge housing positive terminal) in electrical contact with the cell's positive terminal. The overall shape and size of the primary cartridge of the invention can be modified as needed to conform to the overall shape and size of a rechargeable cartridge intended for insertion into the receiving cavity of any specific small sized camcorder or handheld digital camera or other small direct current powered device.

In a specific aspect the cartridge housing of the invention can be of sufficient size to accommodate a cylindrical primary cell typically having a diameter of between about 15 and 18 mm and larger, for example up to about 32 mm and length between about 25 and 50 mm and greater, for example, up to about 58 mm. In a preferred embodiment the cartridge housing of the invention is of sufficient size to accommodate a primary cylindrical lithium cell of standard size designated in the art as a 123A size which corresponds to a cell of 15 mm diameter and 34 mm length. Such cells are characterized by having a lithium metal anode and manganese dioxide or lithiated manganese dioxide cathode and an operating voltage of about 3.0 volts. Alternatively, the cartridge housing of the invention can be sized to accommodate small sized primary lithium cells, for example a CR2 size cell which has a diameter of about 14 mm and length of about 26 mm. It will be appreciated that the housing size can be adjusted as required to house primary lithium cells of other cylindrical sizes either larger or smaller than the above two representative sizes.

In another specific aspect the cartridge housing of the invention can be designed to have an internal volume large enough to house two cylindrical lithium cells which are connected in parallel within the housing. Such cells are also easily inserted into the housing interior preferably through an integrally formed elongated opening in the housing body. The use of two or more primary cells connected in parallel extends the capacity of the cartridge. Alternatively, two or more primary cells could be inserted into the housing interior through an elongated opening in the cartridge housing and the cells connected in series within the cartridge housing to obtain a higher voltage. Although the cartridge housing described herein is intended in its preferred embodiment to house cylindrical primary cells, the concept of the invention extends to other primary cell shapes with the overall shape and size of the housing modified to accommodate such other shaped cells. For example, the cartridge housing of the invention overall shape and size could be modified to accommodate one or more prismatic or rectangular shaped primary cells or one or more button shaped primary cells or one or more elongated noncylindrical shaped primary cells.

In a specific aspect the cartridge housing comprises a partition disk having an opening therethrough. The disk is positioned within the housing interior and is preferably perpendicular to the cartridge housing central longitudinal axis. The disk can divide the housing interior into two compartments. The disk can have positioned in the opening therein a metal strip which is in electrical contact with the exposed cartridge housing positive terminal. A first primary cell can be placed into one of the compartments through an elongated opening in the housing body and a second primary cell can be placed into the other compartment through said same elongated opening in the housing body. The cells are aligned head to head with the cells positive terminals contacting opposite sides of said metal strip therebetween being held in place by said partition disk. Such metal strip thereby electrically connects each of the cell's positive terminals to the cartridge housing positive terminal. Each of the cell's negative terminals are electrically connected to the cartridge housing negative terminal. The two primary cell's are thus connected in parallel. If the cell are primary lithium cells the cartridge voltage will be about 3.0 volts.

BRIEF DESCRIPTION OF THE DRAWINGS

The invention is more fully described with reference to the drawings in which.

DETAILED DESCRIPTION

Figure 1:
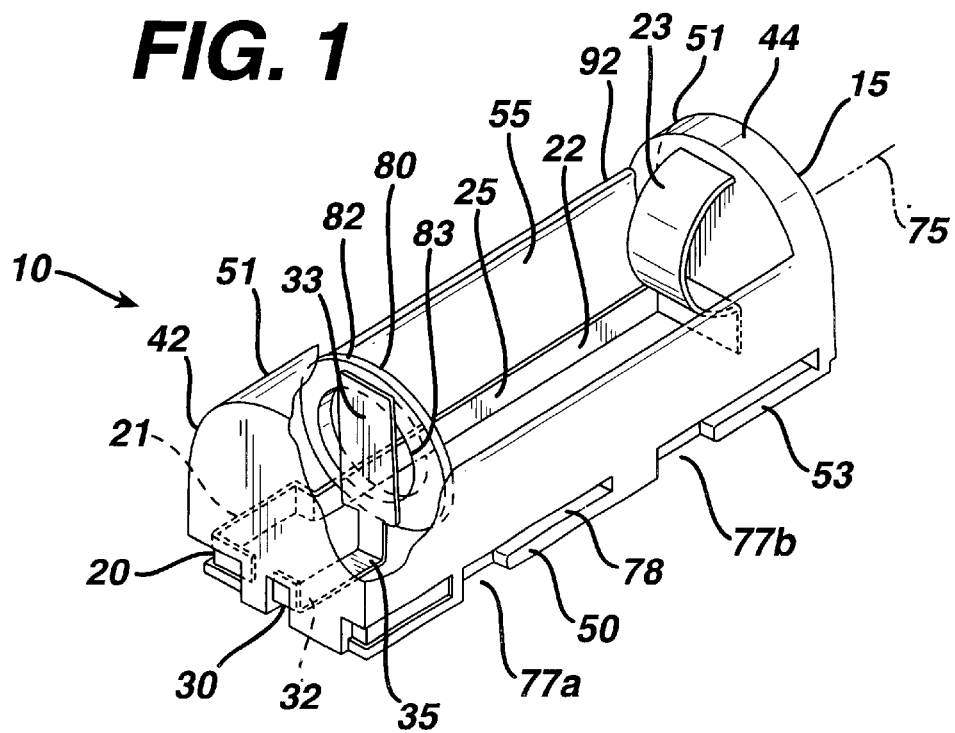
FIG. 1 is an isometric view of the cartridge housing of the invention showing an elongated opening in the housing body for insertion of a primary cell therethrough.
Figure 1A:
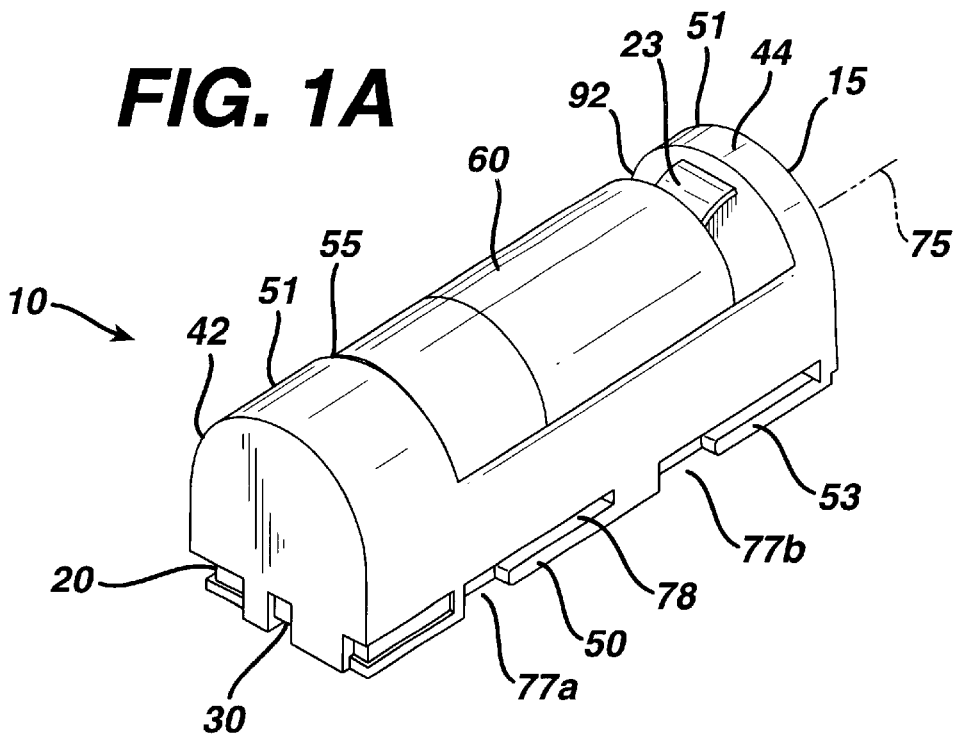
FIG. 1A is an isometric view of the cartridge housing of FIG. 1 with a primary cell inserted therein.

A preferred embodiment of the cartridge 10 of the invention is shown in FIGS. 1 and Fig. The cartridge 10 is shown in FIG. 1 before a cell 60 is inserted therein. The same cartridge 10 with a cell 60 therein is shown in FIG. 1A. Cartridge 10 is designed to accommodate a single primary (nonrechargeable) cell, for example, a cylindrical primary lithium cell having a voltage of about 3.0 volts. The cartridge can have substantially the same overall size as a rechargeable cartridge intended for insertion into the receiving cavity of a small size camcorder or digital camera. In such case the cartridge 10 of the invention with single primary (nonrechargeable) cell therein can be used in place of or interchangeably with the rechargeable cartridge.

Cartridge 10 comprises an elongated housing 15 comprising an elongated housing body 50 which terminates with integrally formed closed front end 42 and opposing closed rear end 44. Preferably, housing body 50 and integrally formed ends 42 and 44 are formed of an electrically insulating material, preferably a plastic. Housing body 50 can be formed of a durable plastic such as polyethylene, polypropylene, polyvinylchloride, and other plastics, preferably thermoplastics which are readily moldable by injection molding. It is not intended to limit housing 15 to any particular plastic material, since a suitable material can be selected from a wide array of conventional plastics. The elongated housing body 50 is formed of contoured surface 51 defining a substantially hollow interior space 92 which is sufficiently large to accommodate at least one primary cell 60 (FIG. 1A) therein. Contoured surface 51 of housing body 50 is preferably a cylindrical surface or partially cylindrical. In this regard housing body 51 can be described as having a circular or more preferably a partially circular or semicircular configuration in cross section take along a plane perpendicular to the central longitudinal axis 75. Desirably elongated housing body 50 has a cylindrical or circular curvature over between about ⅓ and ½ of its circumference with the remaining portion 53 of the housing circumference being substantially flat along the length of the housing body 50 as shown in FIG. 1. Housing body 50 is characterized in that it preferably has an elongated opening 55 in its body 50. Opening 55 appears as an elongated cut out portion in the contoured or cylindrical surface 51. Opening 55 is sufficiently large to allow insertion of a primary cylindrical cell 60 therethrough so that it can lie within the housing interior space 92 as shown in FIG. 1A. Cell 60 is inserted into the interior 92 of the housing so that the cell's positive and negative terminals are in electrical contact, with exposed positive and negative terminals 30 and 20, respectively, on housing 15. The cartridge 10 can then be inserted into a receiving cavity of a digital camcorder or digital camera and the like and is then ready to power such device. When the cell 60 becomes discharged, cartridge 10 can be removed from the device being powered and the cell can be easily removed from the housing interior 92 through opening 55 and replaced with a fresh cell.

Cartridge housing 15 contains a pair of separate electrically conductive strips of metal 25 and 35 therein, typically of plated steel or bronze alloy but may also be of copper or brass or other conductive metal. The conductive strips 25 and 35 are separated and do not contact each other. The conductive strip 25 is intended to be in electrical contact with the negative terminal of primary cell 60 when the cell is inserted into the interior 92 of housing 15. The conductive strip 35 is intended to be in electrical contact with the positive terminal of cell 60.

In the embodiment shown in FIG. 1 conductive strip 25 comprises an elongated body portion 22 which can run parallel to the housing central longitudinal axis 75. The conductive body portion 22 terminates at one end in curved flange surface 23 which can be perpendicular or substantially perpendicular to the housing central longitudinal axis 75. The conductive curved surface 23 is preferably convex curved when viewed from housing front end 42 and remains within the housing interior 92 at a position adjacent to the housing rear end 44. Curved surface 23 has resiliency when physical pressure is applied to it from within the housing interior. Conductive strip 25 terminates at the opposite end in a flanged portion 20 which protrudes from the housing front end 42 and is thus exposed to the external environment. Similarly, conductive strip 35 has an elongated body portion 32 which runs parallel to housing central longitudinal axis 75. The conductive body portion 32 terminates at one end in a positive contact flange 33 which is oriented perpendicular to the housing central longitudinal axis 75. Positive contact flange 33 can be flat or curved and is intended to contact the positive terminal of a cell 60 inserted into the housing 15. Contact flange 33 can be located proximate the front end 42 of housing 15 as shown in FIG. 1, but can be displaced within the housing interior a short distance from said front end 42. Preferably, when only one cell 60 is inserted into interior 92 of housing 15, contact flange 33 is located a distance which is between about 5 and 25% of the length of housing 15 as measured from closed end 42. Desirably, contact flange 33 can be supported by an insulator disk 80 placed within the housing interior 92 in a position perpendicular to the cartridge central longitudinal axis 75. Support disk 80 has a circumventing outer edge 82 and preferably a hollow center 83. Contact flange 33 can be fastened or molded to disk edge 82 in order to keep flange 33 in a rigid upright position as shown in FIG. 1. Conductive body portion 32 terminates at the opposite end in a flanged portion 30 which protrudes from the housing front end 42 and is thus exposed to the external environment.

The cell 60 can be inserted through opening 55 into the interior 92 of housing 15 resulting in cartridge 10 with cell 60 therein as shown in FIG. 1A. The cell 60 is inserted so that its negative terminal faces and contacts the curved conductive flange 23 and the cell's positive terminal faces and contacts conductive flange 33. Thus, when the cell 60 is inserted within housing 15 exposed housing terminal 20 is in electrical contact with the cell's negative terminal and the exposed housing terminal 30 is in electrical contact with the cell's positive terminal. Cartridge 10 can then be inserted into the receiving cavity (not shown) of a camcorder or digital camera and the like in place of the rechargeable cartridge for such device. Care is taken to position one of the housing terminals, for example, the positive terminal 30 at a location which is offset or different from the normal positive contact location on the rechargeable cartridge which the cartridge 10 is intended to replace. This assures that any attempt to recharge the cartridge 10 of the invention with standard recharging equipment will be ineffective, since it is not intended that the cell 60 within cartridge 10 be rechargeable.

The primary (non-rechargeable) electrochemical cell 60 inserted into cartridge housing 15 can be a cell which is commercially available. Such cell, for example, can be a primary lithium cell designated as a $Li/MnO_2$ primary lithium cell. The cell, typically of cylindrical configuration, is available in a number of standard sizes. Such cell has an anode comprising lithium and a cathode comprising manganese dioxide. Lithium primary (nonrechargeable) cells are conventionally formed of spirally wound material comprising an anode formed of a sheet of lithium, a cathode formed of a coating of cathode active material comprising manganese dioxide on a conductive metal substrate (cathode substrate) and a sheet of separator material therebetween, as shown, for example, in U.S. Pat. No. 4,707,421. The electrolyte used in a primary $Li/MnO_2$ cell is formed of a lithium salt dissolved in an organic solvent. Typically, the salt is lithium perchlorate ($LiClO_4$) or lithium trifluoromethanesulfonate ($LiCF_3SO_3$). Other salts which are conventionally used include $LiPF_6$, $LiAsF_6$ and $LiCF_3CO_2$ and $LiBF_4$. Organic solvents can typically include ethylene carbonate/propylene carbonate (EC/PC) dimethoxyethane (DME), dioxolane, gamma-butyrolactone, and diglyme.

Such primary (nonrechargeable) lithium cell is known and in widespread commercial use. These cells are commonly available in a number of standard sizes typically of cylindrical configuration. For example, the cell can be in the form of button cell or elongated cylindrical cell having the size of an AA size cell (14×49 mm). The primary lithium cell are available in other standard size, for example, a standard size CR2 cylindrical cell (14×26 mm) or CR123A size cylindrical cell (15×34 mm). The standard AA cylindrical cell, the CR2 size cylindrical cell, and the CR123A size cylindrical cell are standard cell sizes referenced in the American National Standards Institute (ANSI) battery specification or in the International Electrochemical Commission (IEC) battery specification. Such primary lithium cell has an operating voltage of about 3.0 volts which is twice that of conventional $Zn/MnO_2$ alkaline cells and also has higher energy density (watt-hrs per $cm^3$ of cell volume) than that of a $zinc/MnO_2$ alkaline cells.

In many services, it has been determined herein that the cartridge 10 of the invention containing a primary lithium cell, typically having a voltage of about 3.0 volts can be used to replace a rechargeable cartridge containing a lithium ion rechargeable cell, typically having an average voltage between about 2.8 and 3.5 volts. Lithium ion rechargeable cells are in widespread commercial use and are a well recognizeable type of cell. The negative electrode of a lithium ion cell typically comprises carbon with lithium ions intercalated (inserted) therein. The term "lithium ion cell" as used herein refers to a secondary (rechargeable cell) characterized by the transfer of lithium ions from negative electrode to positive electrode upon cell discharge and from the positive electrode to the negative electrode upon cell charging. During discharge, electrons are released from the negative electrode intercalation compound to balance the positive charge loss due to release of lithium ions therefrom. During charging, electrons are gained by the negative electrode to balance the positive charge gain due to lithium ions being reabsorbed by the negative electrode intercalation compound.

The following is a specific non limiting example, illustrating one practical application of the cartridge 10 (FIG. 1 and FIG. 1A) of the invention. The cartridge 10 has an overall length of about 55 mm and overall width of about 20 mm and depth 20 mm. A CR123A size (15 mm×34 mm) cylindrical primary (nonrechargeable) lithium cell 60 is inserted into housing interior 92 through elongated opening 55. The elongated opening 55 can have a length of about 40 mm and width of about 16 mm so that a CR123A size primary lithium cell can be inserted therein. Such embodiment of cartridge 10 of the invention can be used as a replacement, for example, for the rechargeable lithium ion cartridge having the trade designation NP80 from Fuji Film Company.

Cartridge housing 15 can be provided optionally with indents 77a and 77b and groove 78 located on the side of the housing in a position the same or similar to that used on the NP80 (Fuji Film Co.) rechargeable cartridge. There can be a mating runner within the receiving cavity of the device being powered (not shown) which mates with groove 78. Thus, groove 78 makes it easier for the cartridge 10 to slide into a receiving cavity of a camcorder or camera or other device to be powered. There can also be protrusions within the battery receiving cavity of the device being powered which interlock with indents 77a and 77b thereby holding the cartridge 10 in place within the receiving cavity. It will be appreciated that such groove 78 and indents 77a and 77b can be altered or substituted with equivalents depending on the shape and configuration of the battery receiving cavity of the device being powered. Thus, by way of non limiting example, cartridge 10 of the invention can have the same overall dimensions and interlock features as the NP80 rechargeable cartridge or other such similar sized cartridges. In the specific embodiment shown in FIGS. 1 and 1A, cartridge 10 of the invention can be used as a replacement for the NP80 rechargeable cartridge which is presently used to power the small sized digital camera designated model Fine Pix 6800 digital camera from Fuji Film.

By way of another specific example, the overall size of the opening 55 in cartridge 10 can be made smaller, for example, having a length of 33 mm, and width of 16 mm. Such size cartridge can accommodate a standard CR2 size primary lithium cylindrical cell (14 mm×26 mm). Such cartridge 10 of the invention can be used to power camcorders or digital cameras and the like wherein the battery receiving cavity of the device to be powered is sized to accommodate the cartridge. Alternatively, the length of the cartridge 10 accommodating the primary lithium CR2 cell can be extended to about 55 mm so that it can be used as a replacement for the lithium ion rechargeable NP80 cartridge from Fuji Film Co.

Figure 2:
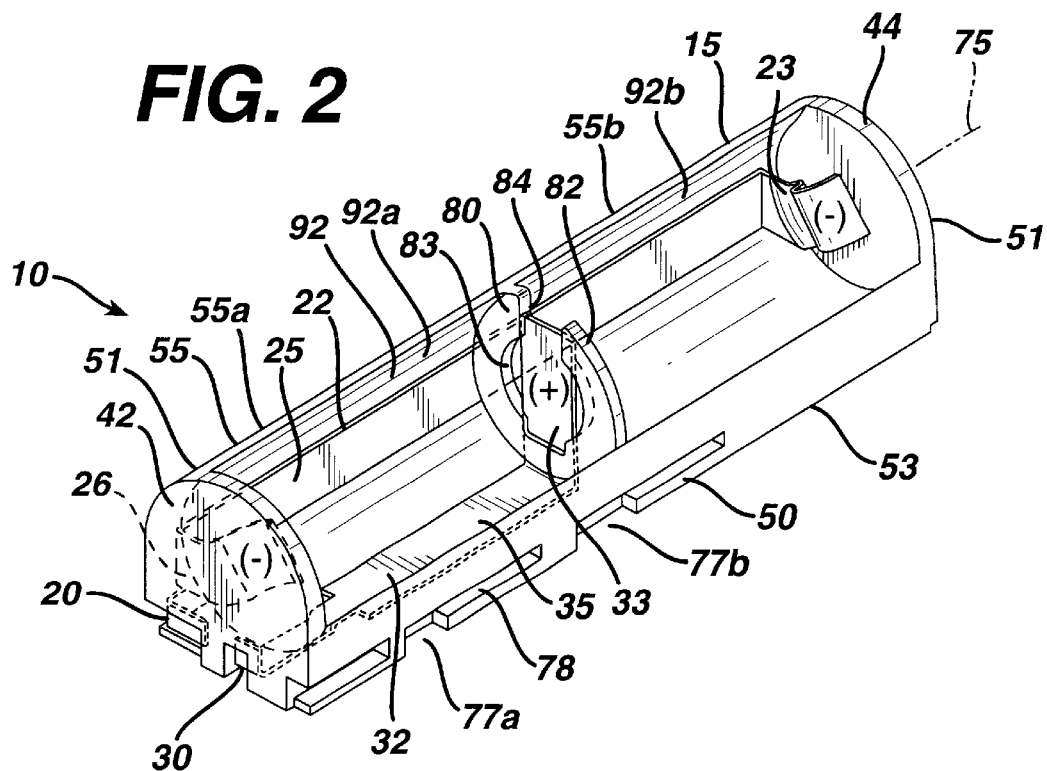
FIG. 2 is an isometric view of another embodiment of the cartridge housing with elongated openings in the housing for insertion of a pair of primary cells therethrough.
Figure 2A:
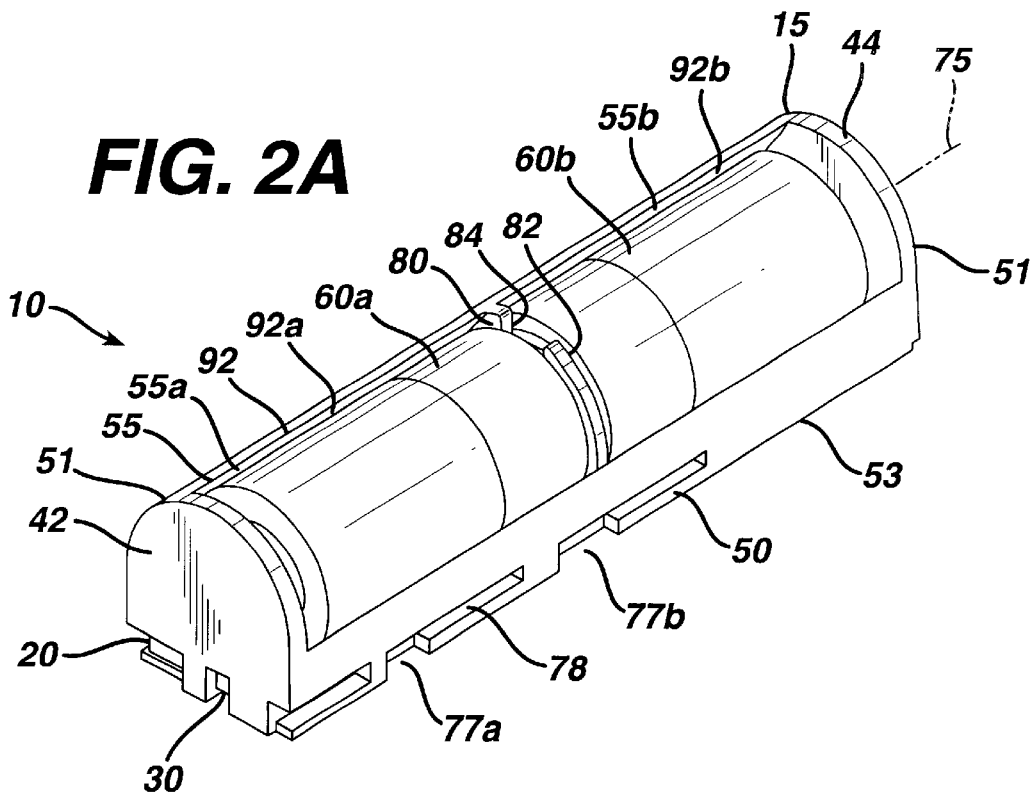
FIG. 2A is an isometric view of the cartridge housing of FIG. 2 with a pair of primary cells therein connected in parallel.

In another embodiment shown in FIG. 2 and FIG. 2A cartridge 10 is designed to accommodate two primary cells 60a and 60b. The cartridge 10 is shown in FIG. 2 before cells 60a and 60b are inserted therein. The same cartridge 10 with cells 60a and 60b inserted therein is shown in FIG. 2A. The two cells are electrically connected in parallel but aligned head to head as shown in FIG. 2A. Each of the cells 60a and 60b can be a primary lithium cell, desirably a same size primary lithium cell. The cells can be conventional size cylindrical CR2 or CR123A size cells or can be of smaller or larger non-standard size. The size of the cartridge 10 can thus be adjusted to accommodate other size primary lithium cells. It will be appreciated that primary lithium cylindrical cells of varying size can be manufactured as needed while employing essentially the same conventional chemistry and cell components. Also, it will be appreciated that the cartridge 10 of the invention in any of the embodiments disclosed herein can be used to accommodate cylindrical primary cells having other cell chemistries, for example, conventional zinc/$MnO_2$ nonrechargeable alkaline cells provided the overall voltage of the cartridge can be high enough when such cells are inserted therein to effectively power the intended device.

The cartridge housing 15 in the embodiment shown in FIG. 2 can be similar in design to that shown and described with reference to FIG. 1, except that the positive contact flange 33 together with its support disk 80 is located within the housing interior 92 about midpoint along the length of housing 15. And the cartridge housing 15 (FIG. 2) is intended to accommodate two primary cells electrically connected in parallel. Cartridge 10 as shown in FIGS. 2 and 2A comprises an elongated housing 15 comprising an elongated housing body 50 which terminates with integrally formed closed front end 42 and opposing closed rear end 44. The elongated housing body 50 is formed of contoured surface 51 defining a substantially hollow interior space 92 which is sufficiently large to accommodate two primary cells 60a and 60b therein. Contoured surface 51 of housing body 50 (FIG. 2) is preferably a cylindrical or partially cylindrical surface having a circular or semicircular cross section taken through a plane perpendicular to central axis 75.

Desirably elongated housing body 50 (FIG. 2) has a cylindrical or circular curvature over between about ⅓ and ½ of its circumference with the remaining portion 53 of the housing circumference being substantially flat along the length of the housing body 50. Housing body 50 (FIG. 2) is characterized in that it preferably has an elongated opening 55 in its body 50. Opening 55 appears as an elongated cut out portion in the contoured or cylindrical surface 51. Opening 55 is sufficiently large to allow insertion of a plurality, for example, two primary cylindrical cells 60a and 60b therethrough so that they can lie within the housing interior space 92 as shown in FIG. 2A. There can be one or more partitions, for example, in the form of one or more disks 80 within the housing interior space 92 to divide interior 92 into two or more compartments. In the specific embodiment shown in FIG. 2, support disk 80 divides the housing interior 92 into two compartments 92a and 92b. In such embodiment elongated opening 55 is thus also divided by support disk 80 into two separate openings, 55a and 55b. One primary cell 60a can be inserted into compartment 92a through opening 55a and a second primary cell can be inserted into compartment 92b through opening 55b. The two primary cells are preferably cylindrical lithium primary cells, above described. Typically, cells 60a and 60b can be a pair of lithium primary cells of size AA, CR2 or CR123A or other cylindrical lithium primary cells of smaller or larger size.

As shown in the embodiment of FIG. 2 the support disk 80 can be fastened or adhered to the inside surface of housing body 50 so that it lies in a plane perpendicular to longitudinal axis 75, about midway along the length of said housing. Disk 80 can have a hollow central portion 83 therein defined by surrounding disk edge 82. A portion of disk edge 82 protrudes from the housing interior 92 and forms a portion of the housing external surface. Positive contact flange 33 lies within hollow central portion 83 and is held in place therein by peripheral edge 82 of disk 80. The support disk 80 with positive contact flange 33 held in place therein divides the housing interior 92 into two cavities 92a and 92b. One primary cell 60a can be inserted into cavity 92a and a second primary cell 60b can be inserted into cavity 92b with the positive terminals of each cell aligned head to head (FIG. 2A). The hollow central portion 83 of disk 80 exposes each side of contact flange 33 allowing contact flange 33 to be contacted one side by the positive terminal of primary cell 60a and on the other side by the positive terminal of the second primary cell 60b.

Housing 15 (FIG. 2) also has an additional negative contact flange 26 therein at terminal end 42. Negative contact flange 26 is perpendicular to the central longitudinal axis 75, and is in electrical contact with the negative conductive strip 25 running along the length of housing 15 within interior space 92. Contact flange 26 can be formed as an integral extension of conductive strip 25 or it can be formed as a separate component which can be welded to conductive strip 25. One primary lithium cell 60a can be inserted through elongated opening 55a into cavity 92a so that the cell's positive terminal abuts and pushes against positive contact flange 33 and the cell's negative terminal abuts negative contact flange 26. A second, typically same size primary lithium cell 60b, is inserted through opening 55b into cavity 92b so that its positive terminal abuts and pushes against positive contact flange 33 and the cell's negative terminal abuts negative contact 23 at housing end 44. In such arrangement cells 60a and 60b are electrically connected in parallel. The cartridge housing negative terminal 20 and positive terminal 30, which are in electrical contact with the cells' negative terminal and positive terminals, respectively, can be located on the front end 42 of the housing 15 as shown in FIGS. 2 and 2A in the same manner as described with reference to FIGS. 1 and 1A. There can be provided an accessible gap or opening 84 in the peripheral edge of 82 of disk 80. Such gap 84 makes it easier to insert each cell 60a and 60b into their respective cavities 92a and 92b.

Other like features shown in FIG. 2 are marked with the same reference numbers as in FIG. 1 and the description of such features made hereinabove with respect to FIG. 1 also applies to FIG. 2. Similarly like features shown in FIG. 2A are marked with the same reference numbers as in FIG. 1A and the description of such features made hereinabove with respect to FIG. 1A also applies to FIG. 2A.

The following is a specific non limiting example of a specific size of cartridge 10 shown in FIGS. 2 and 2A. The cartridge 10 has an overall length of about 80 mm and overall width of about 20 mm and depth of 20 mm. A pair of CR123A size (15 mm×34 mm) cylindrical primary (nonrechargeable) lithium cell 60a and 60b are inserted into housing interior 92. One cell can be inserted into housing cavities 92a through opening 55a and the other into housing cavity 92b through opening and 55b so that they are electrically connected in parallel as above described. The elongated openings 55a and 55b can each have a length of about 36 mm and width of about 16 mm so that a CR123A size primary lithium cell can be inserted therethrough. Such cartridge 10 of the invention can be used to power camcorders or digital cameras and the like wherein the battery receiving cavity of the device to be powered is sized to accommodate the cartridge.

The cartridge 10 of the invention as described with respect to the above specific embodiments is not intended to be limited to being a replacement for rechargeable battery cartridges. The cartridge 10 overall configuration can be modified within the concept of the invention permitting its application as a primary power source for small camcorders, digital cameras and the like irrespective of whether such devices were intended to be powered by rechargeable battery cartridges.

Although the present invention has been described with respect to specific embodiments, it should be appreciated that variations are possible within the concept of the invention. Accordingly, the invention is not intended to be limited to the specific embodiments described herein but will be defined by the claims and equivalents thereof.

What is claimed is:

1. A battery cartridge comprising a housing and two primary (nonrechargeable) electrochemical cells therein each of said cells being cylindrical and having a positive terminal end and opposing negative terminal end, wherein said housing comprises an elongated body having a substantially hollow interior, said cells being positioned within said interior and aligned in stacked arrangement with one terminal end of one cell facing the same terminal end of the other, wherein said elongated body of said housing terminates in a pair of opposing end surfaces separated from each other by the length of said elongated body, said elongated body comprises a contoured surface having an elongated opening therein, said cells being insertable into said housing interior through said elongated opening, said cartridge further comprising a disk within said housing interior, said disk located between said housing end surfaces and oriented perpendicular to the housing central longitudinal axis and dividing the cartridge into two compartments one for each cell, said disk having an opening therethrough with an electrically conductive material positioned within said opening, wherein said housing has a negative and a positive terminal protruding from said housing and exposed to the external environment, wherein said electrically conductive material within said disk is in electrical contact with one of said terminals protruding from said housing, said cells being electrically connected in parallel with the same terminal end of each of the two cells electrically contacting said conductive material within said disk and said housing positive terminal being in electrical contact with the positive terminal of each of said cells and said housing negative terminal being in electrical contact with the negative terminal of each of said cells.

2. The battery cartridge of claim 1 wherein said cells are nonrechargeable lithium cells.

3. The battery cartridge of claim 1 wherein said contoured surface has a convex shape when viewed from outside the cartridge.

4. The battery cartridge of claim 3 wherein said contoured surface has a substantially semicircular curvature.

5. The battery cartridge of claim 1 wherein said disk is formed of an electrically insulating material.

6. The battery cartridge of claim 2 comprising an electrically conductive metal strip positioned within said opening in said disk, said metal strip being in contact with the positive terminals of both of said cells and said metal strip also being in electrical contact with said exposed positive terminal on said cartridge housing.

7. The battery cartridge of claim 1 wherein said disk is located within said housing interior at a position about midway between said opposing end surfaces.

8. The battery cartridge of claim 1 wherein said disk divides said housing elongated opening into two adjacent elongated openings and divides the housing interior into two compartments, wherein one of said cells in insertable into one of said compartments through one of said openings and the other of said cells is insertable into the other of said compartments through the other of said openings.

9. The battery cartridge of claim 8 wherein said two compartments are the same size and each of said cells are the same size cell.

10. The battery cartridge of claim 1 wherein the cartridge has a voltage of about 3.0 volts as measured across the positive and negative terminal exposed on said cartridge housing.

11. The battery cartridge of claim 1 wherein said cartridge is insertable in a receiving cavity within a handheld camcorder or digital camera to power said device.

12. The battery cartridge of claim 1 wherein said negative and positive terminals exposed on said cartridge housing both protrude from the same end surface of said housing.

* * * * *